United States Patent
Kim et al.

(10) Patent No.: US 12,038,558 B2
(45) Date of Patent: Jul. 16, 2024

(54) CURVED GLASS COMPRISING ANTI-REFLECTION AND ANTI-SCRATCH COATING LAYER AND ELECTRONIC DEVICE

(71) Applicant: Samsung Electronics Co., Ltd., Gyeonggi-do (KR)

(72) Inventors: Yongyi Kim, Gyeonggi-do (KR); Min Kim, Gyeonggi-do (KR); Yongha Kim, Gyeonggi-do (KR); Yongjoon Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 557 days.

(21) Appl. No.: 17/261,898

(22) PCT Filed: Jun. 24, 2019

(86) PCT No.: PCT/KR2019/007565
§ 371 (c)(1),
(2) Date: Jan. 21, 2021

(87) PCT Pub. No.: WO2020/027437
PCT Pub. Date: Feb. 6, 2020

(65) Prior Publication Data
US 2021/0286106 A1    Sep. 16, 2021

(30) Foreign Application Priority Data

Jul. 31, 2018 (KR) .................. 10-2018-0089402

(51) Int. Cl.
*G02B 1/115* (2015.01)
*G02B 1/14* (2015.01)

(52) U.S. Cl.
CPC ............... *G02B 1/115* (2013.01); *G02B 1/14* (2015.01)

(58) Field of Classification Search
CPC .. G02B 1/115; G02B 1/14; G02B 1/00; G02B 1/10; G02B 1/11; G02B 1/113;
(Continued)

(56) References Cited

U.S. PATENT DOCUMENTS

| 8,339,707 B2 | 12/2012 | Oya et al. |
| 9,625,620 B2 | 4/2017 | Beinat et al. |

(Continued)

FOREIGN PATENT DOCUMENTS

| JP | 2013-250295 A | 12/2013 |
| KR | 10-2010-0046873 A | 5/2010 |

(Continued)

OTHER PUBLICATIONS

Korean Examination Report dated Mar. 2, 2023.
Notice of Final Rejection dated Sep. 1, 2023.
Notice of Patent Grant dated Nov. 13, 2023.

*Primary Examiner* — Arnel C Lavarias
(74) *Attorney, Agent, or Firm* — Cha & Reiter, LLC

(57) ABSTRACT

Disclosed is an electronic device. An electronic device according to various embodiments includes: a housing; a first glass plate attached to the housing and forming a portion of an external surface of the electronic device, wherein the first glass plate includes a flat portion, a curved portion extending from an edge of the flat portion, a first surface facing outwardly from the electronic device, and a second surface facing inwardly towards the electronic device; and a coating layer formed on the first surface of the first glass plate, wherein the coating layer includes a first layer having a first refractive index and containing at least one first material, and includes a second layer disposed further from the first surface than the first layer, containing at least one second material, and having a second refractive index different from the first refractive index.

8 Claims, 13 Drawing Sheets

(58) Field of Classification Search
CPC . G02B 1/18; G02B 5/28; G02B 5/281; G02B 5/285; G02B 5/286; G02B 27/0006
USPC ....... 359/601, 609, 577, 580, 582, 586, 588, 359/589, 590
See application file for complete search history.

(56) References Cited

U.S. PATENT DOCUMENTS

| | | |
|---|---|---|
| 2013/0177751 A1 | 7/2013 | Oh et al. |
| 2014/0322502 A1 | 10/2014 | Koyama et al. |
| 2014/0335330 A1 | 11/2014 | Bellman et al. |
| 2014/0376094 A1* | 12/2014 | Bellman .................. G02B 1/10 428/428 |
| 2017/0059749 A1* | 3/2017 | Wakatsuki .............. C03C 21/00 |
| 2017/0075039 A1 | 3/2017 | Hart et al. |
| 2018/0011225 A1 | 1/2018 | Bellman et al. |
| 2020/0310000 A1* | 10/2020 | Hart ....................... G02B 1/115 |

FOREIGN PATENT DOCUMENTS

| | | |
|---|---|---|
| KR | 10-2013-0081575 A | 7/2013 |
| KR | 10-2016-0005748 A | 1/2016 |
| KR | 10-2018-0009586 A | 1/2018 |
| KR | 10-2018-0052701 A | 5/2018 |
| KR | 10-2019-0026005 A | 3/2019 |

* cited by examiner

CURVED GLASS COMPRISING ANTI-REFLECTION AND ANTI-SCRATCH COATING LAYER AND ELECTRONIC DEVICE

CROSS REFERENCE TO RELATED APPLICATIONS

This application is a National Phase Entry of PCT International Application No. PCT/KR2019/007565, which was filed on Jun. 24, 2019, and claims a priority to Korean Patent Application No. 10-2018-0089402, which was filed on Jul. 31, 2018, the contents of which are incorporated herein by reference.

TECHNICAL FIELD

Various embodiments relate to a curved glass including an anti-reflection and anti-scratch coating layer and an electronic device.

BACKGROUND ART

Not only a function an electronic device provides to a user but also an appearance design and materials recognized with sight, etc. can be factors significant for user's selecting the electronic device.

In more and more cases, an outward appearance of the electronic device employs a curved design in order to enhance aesthetic appreciation. The electronic device can include a glass plate constructing an outer surface of the electronic device, to forward a light emitted from a display outside, and can utilize the same for an appearance design. For the sake of the performance of electronic equipment, a user convenience, and a design differentiation, the outer surface of the electronic device can be formed to have a curved surface.

To increase a visibility of the light emitted from the display and protect a glass attached to a display surface, the appearance of the electronic device can apply anti-reflection coating and anti-scratch coating.

DISCLOSURE OF INVENTION

Technical Problem

In case of forming, in a curved region, an anti-reflection and anti-scratch coating layer, a flat portion, and a curved portion, of the glass plate of the electronic device can have mutually different reflectance spectrums. If there is a difference of the reflection spectrums, colors of the flat portion and the curved portion recognized with sight can be different from each other. Accordingly, a way for solving this is requested.

Solution to Problem

An electronic device of an embodiment of the present disclosure can include a first glass plate attached to the housing and forming a portion of an external surface of the electronic device, wherein the first glass plate includes a flat portion and a curved portion extending from an edge of the flat portion, and includes a first surface facing outwardly from the electronic device and a second surface facing inwardly towards the electronic device, and a coating layer formed on the first surface of the first glass plate. The coating layer can include a first layer having a first refractive index and containing at least one first material, and a second layer disposed further from the first surface than the first layer, and containing at least one second material, and having a second refractive index different from the first refractive index. A combination of the first glass plate and the coating layer can have a transmittance of 91% to 99%. With respect to a light having a wavelength of 700 nm to 900 nm, a difference between a minimum reflectance and a maximum reflectance can be 3% or less.

A curved glass of an embodiment of the present disclosure can include a glass plate including a flat portion and a curved portion extending from an edge of the flat portion, and a coating layer laminated on a surface having a swollen curved portion of the glass plate. The coating layer can include an anti-scratch layer, a plurality of low refractive layers formed in at least one surface of the anti-scratch layer, and high refractive layers arranged to cross with the plurality of low refractive layers. A combination of the flat portion of the first glass plate and the coating layer can have a visible ray transmittance of 91% to 99%. With respect to a visible ray and a near infrared ray, a difference between a maximum reflectance and a minimum reflectance can be 3% or less.

Advantageous Effects of Invention

A curved glass including an anti-reflection and anti-scratch coating layer of an embodiment and an electronic device can minimize a reflection spectrum difference between a curved portion and a flat portion to reduce a difference of colors recognized with sight.

BEST MODE FOR CARRYING OUT THE INVENTION

Figure 1:
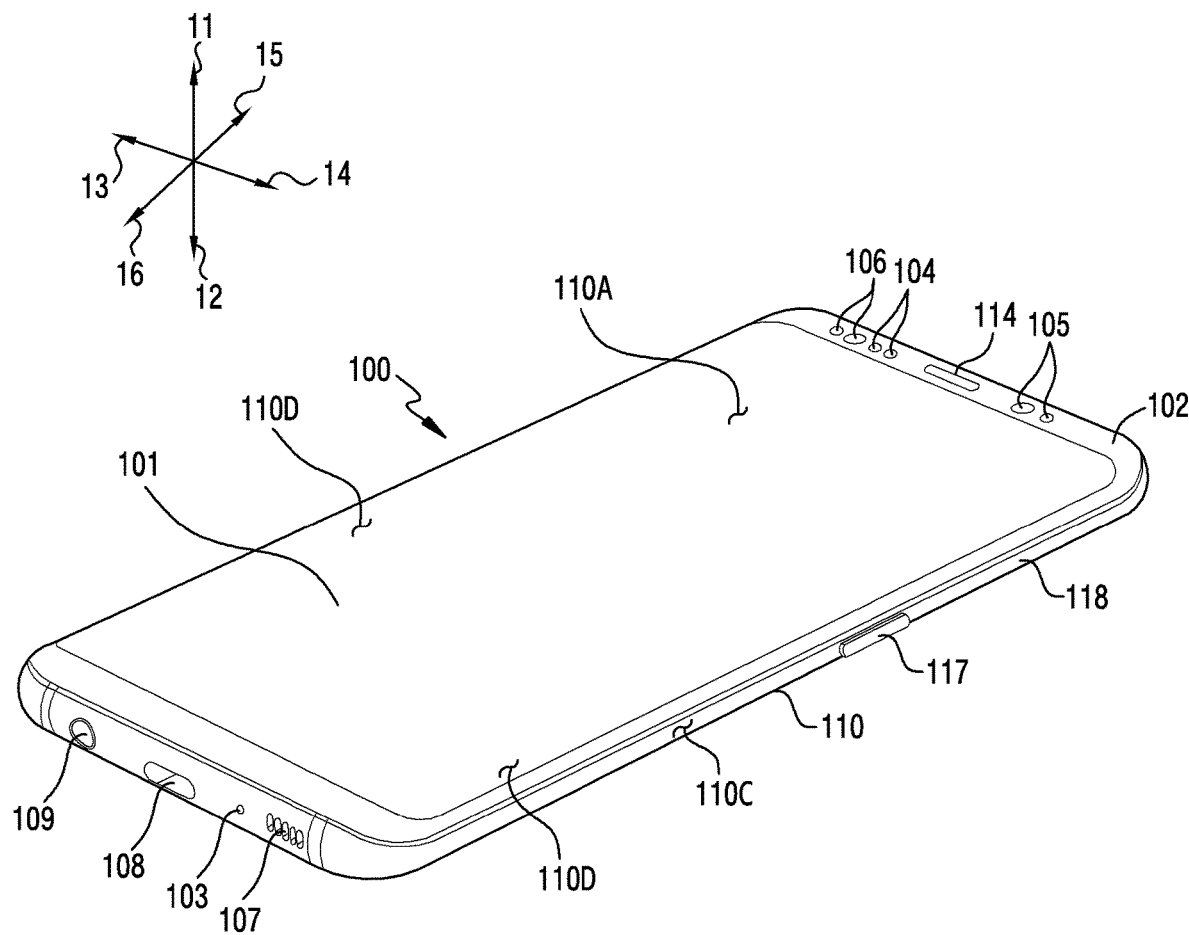
FIG. 1 is a front perspective view of a mobile electronic device according to an embodiment.
Figure 2:
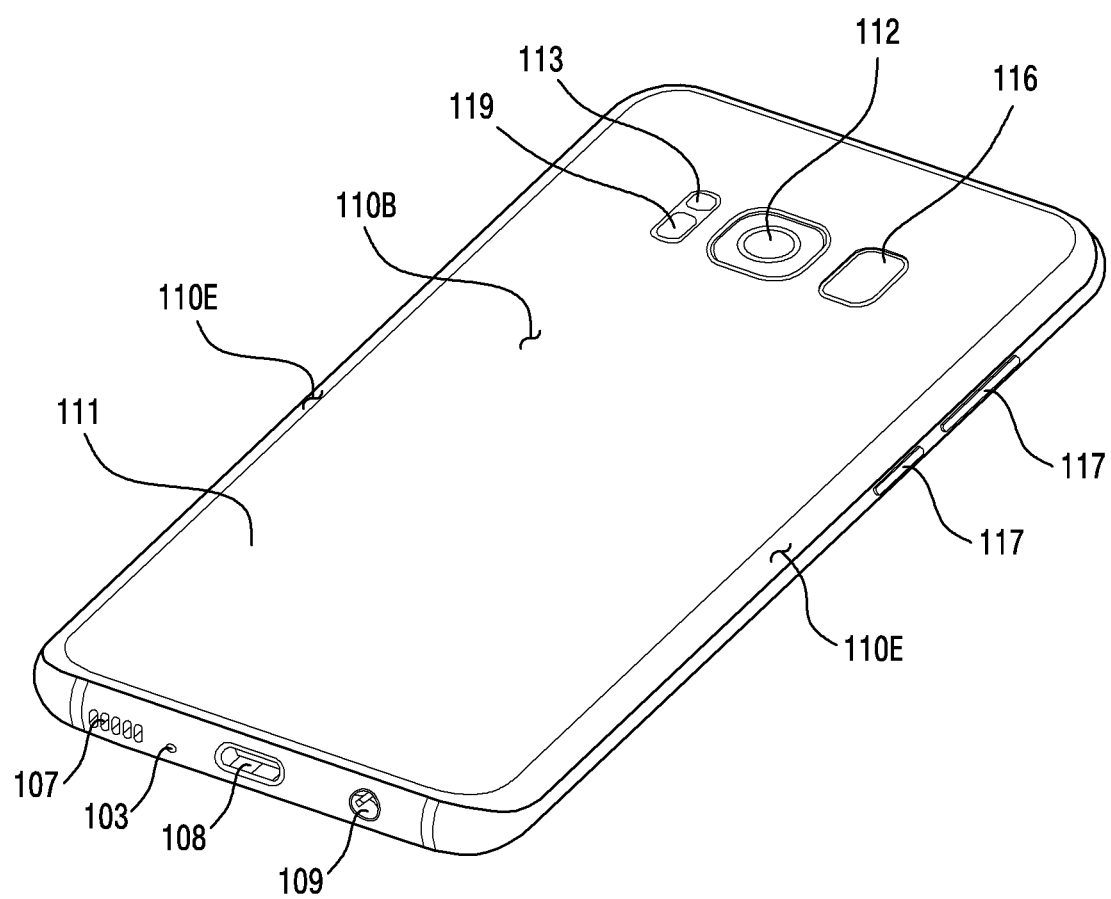
FIG. 2 is a rear perspective view of the electronic device of FIG. 1 according to an embodiment.

FIG. 1 is a front side perspective view illustrating an electronic device 100 according to various embodiments. FIG. 2 is a rear side perspective view illustrating the electronic device 100 according to various embodiments. Referring to FIGS. 1 and 2, the electronic device 100 according to an embodiment may include a housing 110 including a first face (or a front face) 110A, a second face (or a rear face) 110B, and a side face 110C surrounding the space between the first face 110A and the second face 110B. In another embodiment (not illustrated), the term "housing" may refer to a structure forming some of the first face 110A, the second face 110B, and the side face 110C of FIG. 1. According to an embodiment, at least a portion of the first face 110A may be formed of a substantially transparent front plate 102 (e.g., a glass plate or a polymer plate including various coating layers). The second face 110B may be formed by a substantially opaque rear plate 111. The rear plate 111 may be formed of, for example, coated or colored glass, ceramic, polymer, or metal (e.g., aluminum, stainless steel (STS), or magnesium), or a combination of two or more of these materials. The side face 110C may be formed by a side bezel structure 118 (or a "side member") coupled to the front plate 102 and the rear plate 111 and including a metal and/or a polymer. In some embodiments, the rear plate 111 and the side bezel structure 118 may be integrally formed, and may include the same material (e.g., a metal material such as aluminum).

In the illustrated embodiment, the front plate 102 may include, at the long opposite side edges thereof, two first areas 110D, which are bent from the first face 110A towards the rear plate 111 and extend seamlessly. In the illustrated embodiment (see FIG. 2), the rear plate 111 may include, at the long opposite side edges thereof, two second areas 110E, which are bent from the second face 110B towards the front plate 102 and extend seamlessly. In some embodiments, the front plate 102 (or the rear plate 111) may include only one of the first areas 110D (or the second areas 110E). In another embodiment, some of the first areas 110D and the second areas 110E may not be included. In the embodiments described above, when viewed from a side of the electronic device 100, the side bezel structure 118 may have a first thickness (or width) on the side faces, which do not include the first areas 110D or the second areas 110E, and may have a second thickness (or width), which is smaller than the first thickness, on the side faces, which include the first areas 110D or the second areas 110E.

According to an embodiment, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments, at least one of the components (e.g., the key input devices 117 or the light-emitting elements 106) may be omitted from the electronic device 100, or the electronic device 100 may additionally include other components.

According to an embodiment, the display 101 may be exposed through a large portion of, for example, the front plate 102. In some embodiments, at least a portion of the display 101 may be exposed through the front plate 102 forming the first face 110A and the first areas 110D of the side faces 110C. In some embodiments, the edges of the display 101 may be formed to be substantially the same as the shape of the periphery of the front plate 102 adjacent thereto. In another embodiment (not illustrated), the distance between the periphery of the display 101 and the periphery of the front plate 102 may be substantially constant in order to enlarge the exposed area of the display 101.

In another embodiment (not illustrated), a recess or an opening may be formed in a portion of the screen display area of the display 101, and at least one of the audio module 114, the sensor module 104, the camera module 105, and the light-emitting elements 106 may be aligned with the recess or the opening. In another embodiment (not illustrated), the rear face of the screen display area of the display 101 may include at least one of the audio module 114, the sensor module 104, the camera module 105, the fingerprint sensor 116, and the light-emitting elements 106. In another embodiment (not illustrated), the display 101 may be coupled to or disposed adjacent to a touch-sensitive circuit, a pressure sensor that is capable of measuring a touch intensity (pressure), and/or a digitizer that detects a magnetic-field-type stylus pen. In some embodiments, at least some of the sensor modules 104 and 119 and/or at least some of the key input devices 117 may be disposed in the first areas 110D and/or the second areas 110E.

According to an embodiment, the audio modules 103, 107, and 114 may include a microphone hole 103 and speaker holes 107 and 114. The microphone hole 103 may include a microphone disposed therein so as to acquire external sound, and in some embodiments, multiple microphones may be disposed therein so as to detect the direction of sound. The speaker holes 107 and 114 may include an external speaker hole 107 and a phone call receiver hole 114. In some embodiments, the speaker holes 107 and 114 and the microphone hole 103 may be implemented as a single hole, or a speaker may be included without the speaker holes 107 and 114 (e.g., a piezo speaker).

According to an embodiment, the sensor modules 104, 116, and 119 may generate an electrical signal or a data value corresponding to the internal operating state or the external environmental state of the electronic device 100. The sensor modules 104, 116, and 119 may include, for example, a first sensor module 104 (e.g., a proximity sensor), a second sensor module (not illustrated) (e.g., a fingerprint sensor) disposed on the first face 110A of the housing 110, a third sensor module 119 (e.g., an HRM sensor), and/or a fourth sensor module 116 (e.g., a finger print sensor) disposed on the second face 110B of the housing 110. The fingerprint sensor may be disposed not only on the first face 110A of the housing 110 (e.g., the display 101), but also on the second face 110B. The electronic device 100 may further include at least one of sensor modules (not illustrated) such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 105, 112, and 113 may include, for example, a first camera device 105 disposed on the first face 110A of the electronic device 100 and a second camera device 112 and/or a flash 113 disposed on the second face 110B of the electronic device 100. The camera modules 105 and 112 may include one or more lenses, an image sensor, and/or an image signal processor. The flash 113 may include, for example, a light emitting diode or a xenon lamp. In some embodiments, two or more lenses (e.g., an infrared camera lens, a wide-angle lens, and a telephoto lens) and image sensors may be disposed on one face of the electronic device 100.

According to an embodiment, the key input devices 117 may be disposed on the side face 110C of the housing 110. In another embodiment, the electronic device 100 may not include some or all of the above-mentioned key input devices 117, and a key input device 117, which is not included in the electronic device 100, may be implemented in another form, such as that of a soft key or the like, on the display 101. In some embodiments, the key input devices may include a sensor module 116 disposed on the second face 110B of the housing 110.

According to an embodiment, the light-emitting element 106 may be disposed on, for example, the first face 110A of the housing 110. The light-emitting element 106 may provide, for example, information about the state of the electronic device 100 in an optical form. In another embodiment, the light-emitting element 106 may provide a light source that is interlocked with, for example, the operation of the camera module 105. The light-emitting element 106 may include, for example, an LED, an IR LED, and a xenon lamp.

The connector holes 108 and 109 may include a first connector hole 108 that is capable of accommodating a connector (e.g., a USB connector) for transmitting and receiving power and/or data to and from an external electronic device, and/or a second connector hole 109 that is capable of receiving a connector (e.g., an earphone jack) for transmitting and receiving an audio signal to and from an electronic device.

Figure 3:
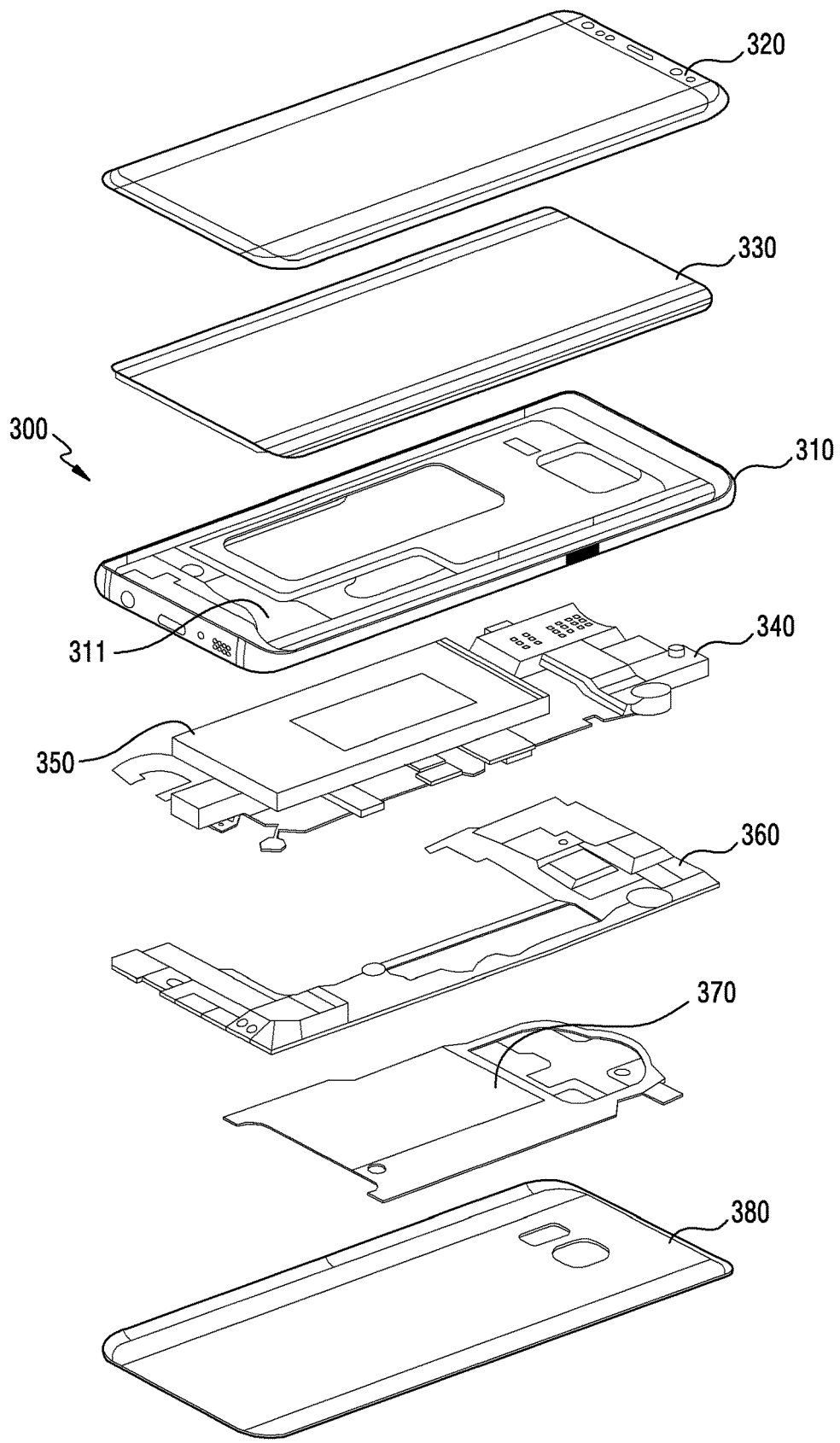
FIG. 3 is an exploded perspective view of the electronic device of FIG. 1 according to an embodiment.

Referring to FIG. 3, an electronic device 300 (e.g., the electronic device 100 in FIG. 1) may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, at least one of the components (e.g., the first support member 311 or the second support member 360) may be omitted from the electronic device 300, or the electronic device 100 may additionally include other components. At least one of the components of the electronic device 300 may be the same as or similar to at least one of the components of the electronic device 100 of FIG. 1 or 2, and a redundant description thereof is omitted below.

According to an embodiment, the first support member 311 may be disposed inside the electronic device 300 so as to be connected to the side bezel structure 310, or the first support member 311 may be integrally formed with the side bezel structure 310. The first support member 311 may be formed of, for example, a metal material and/or a non-metal material (e.g., a polymer). The display 330 may be coupled to one face of the first support member 311, and the printed circuit board 340 may be coupled to the other face of the first support member 32. On the printed circuit board 340, a processor, memory, and/or an interface may be mounted. The processor may include at least one of, for example, a central processing unit (CPU), an application processor, a graphics processor, an image signal processor, a sensor hub processor, or a communication processor.

According to an embodiment, the memory may include, for example, volatile memory or nonvolatile memory.

According to an embodiment, the interface may include, for example, a high-definition multimedia interface (HDMI), a universal serial bus (USB) interface, an SD card interface, and/or an audio interface. The interface may electrically or physically connect, for example, the electronic device 100 to an external electronic device, and may include a USB connector, an SD card/an MMC connector, or an audio connector.

According to an embodiment, the battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed within the electronic device 300, or may be detachably mounted on the electronic device 300.

According to an embodiment, the antenna 370 may be disposed between the rear plate 380 and the battery 350. The antenna 370 may include, for example, a nearfield communication (NEC) antenna, a wireless charging antenna, and/or a magnetic secure transmission (MST) antenna. The antenna 370 may perform short-range communication with, for example, an external electronic device, or may transmit/receive power required for charging to/from the external device in a wireless manner. In another embodiment, an antenna structure may be formed by the side bezel structure 310, a portion of the first support member 311, or a combination thereof.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Figure 4A:
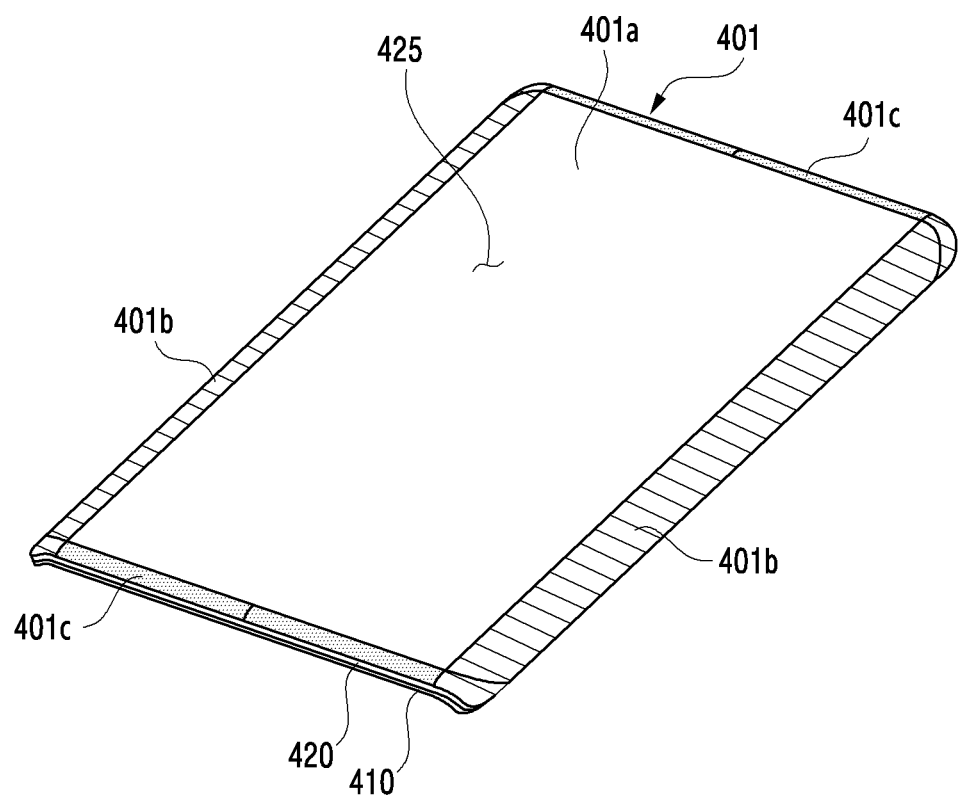
FIG. 4A is a perspective view of a curved glass according to an embodiment.
Figure 4B:
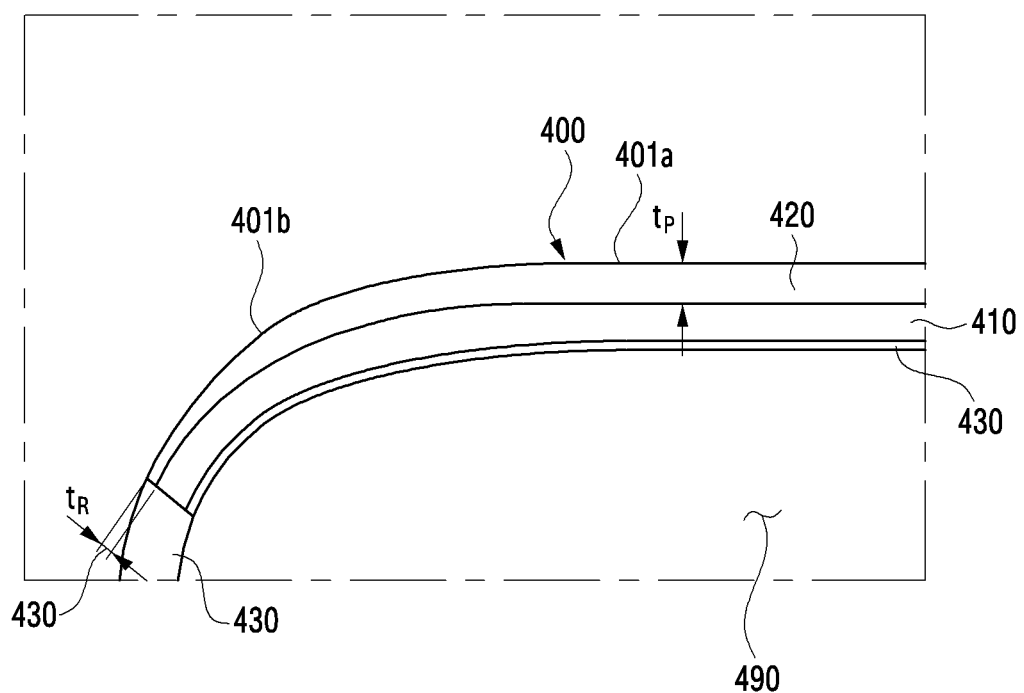
FIG. 4B is a cross section of an electronic device according to an embodiment.
Figure 4C:
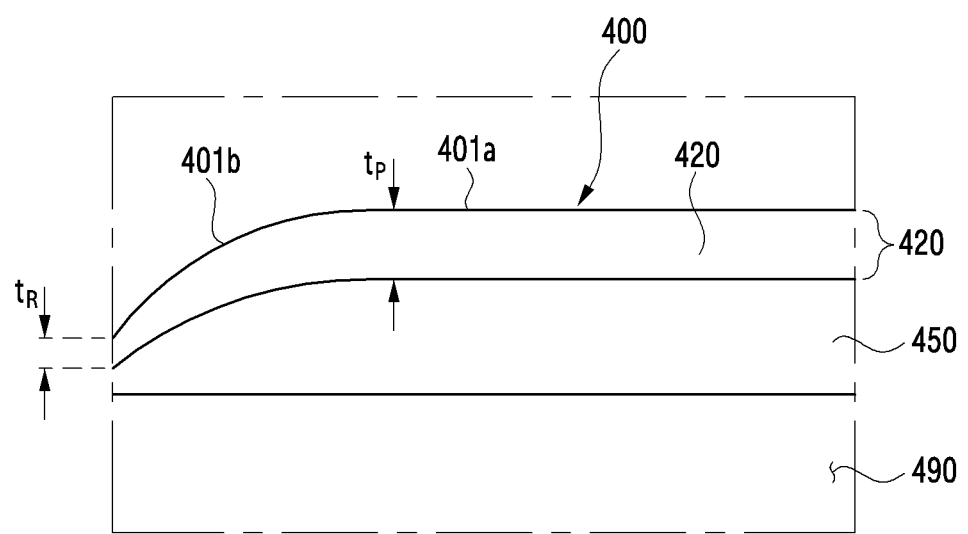
FIG. 4C is a cross section of an electronic device according to another embodiment.

FIG. 4A is a perspective view of a curved glass according to an embodiment. FIG. 4B is a cross section of an electronic device according to an embodiment. FIG. 4C is a cross section of an electronic device according to another embodiment.

Referring to FIG. 4A, the curved glass 401 can include a glass plate 410 (e.g., the front plate 102 of FIG. 1 and/or the back plate 111 of FIG. 2) and a coating layer 420.

According to an embodiment, the glass plate 410 can be arranged in a surface which a panel of a display (e.g., the display 330 of FIG. 3) faces towards, and forward a light emitted from the display 330 outside, so a user can recognize information displayed in the display 330.

According to an embodiment, the glass plate 410 can form at least a portion of a region which needs a curved surface of the electronic device. The glass plate 410 can form one surface of a housing formed by the curved surface of the electronic device, and can form a glass cover of a curved display in a wearable device, and can be used as a curved lens part of an augmented reality device.

According to an embodiment, the glass plate 410 can be formed of at least one material among polymer materials such as polycarbonate (PC) of polymer materials, polymethyl methacrylate (PMMA), polyimide (PE), polyethylene terephthalate (PET), polypropylene terephthalate (PPT), etc., or a glass. According to an embodiment, the glass plate 410 can include a multi-layer structure of various materials. According to an embodiment, the glass plate 410 can have a thickness of 2 mm or less.

According to an embodiment, the curved glass 401 can include a flat portion 401a and a curved portion 401b. The flat portion 401a indicates a flatten surface of the transparent glass 401, and can be a surface not processed in the curved glass 401. The curved portion 401b can be formed by a curved surface which faces towards an edge of the back plate (111 of FIG. 2) which is arranged to face from a long edge of the flat portion 401a of the curved glass 401. According to various embodiments, the curved glass 401 can include a curved portion 401c in a short edge region of the flat portion 401a.

According to an embodiment, the display 330 can be arranged beneath the curved portion 401b formed in the long edge, and a light emitted from the display 330 can transmit the curved portion 401b and be forwarded outside. According to various embodiments, the display can be arranged even below the curved portion 401c formed in the short edge, and a light emitted from the display can transmit the curved portion 401c and be forwarded outside.

According to an embodiment, it is formed on a surface 425 of the glass plate 410 which includes a swollen surface of the curved portion 401b of the glass plate 410. The coating layer 420 can prevent a scratch formed by scratching the glass plate 410, and perform a function of protecting the glass plate 410, and perform a function of preventing a light reflected from the glass plate 410. The coating layer 420 can include an anti-scratch coating and anti-reflection coating layer. According to an embodiment, a visible ray transmittance, in which a light emitted from the display transmits the glass plate 410 and the coating layer 420, can be 91% or more.

According to an embodiment, the coating layer 420 can be formed in the front plate 102 and the back plate 111. Even the back plate 111 can be formed by a glass plate having a curved surface, and can laminate the coating layer 420 to perform an anti-scratch function. According to various embodiments, the coating layer 420 can be formed in an outer surface of a housing which forms an appearance of the electronic device (e.g., the electronic device 100 of FIG. 1).

Referring to FIG. 4B and FIG. 4C, the electronic device 400 can include a glass plate 410 or 450, an optical coating layer 420, and a side member 430.

According to an embodiment, the front glass plate 410 forming a front surface of the electronic device 400 and the back glass plate 450 forming a rear surface can be arranged to face each other. The side member 430 can form a side surface of the electronic device 400, and separate the front glass plate 410 and the back glass plate 450 to provide an internal space 490.

According to an embodiment, the internal space 490 can mount electronic components of the electronic device 400. The electronic components mounted in the internal space 490 can be protected from the external by a housing which is formed by the front glass plate 410, the back glass plate 450 and the side member 430.

According to an embodiment, the coating layer 420 can be deposited on a front surface of the front glass plate 410, and a display can be arranged in a rear surface. The curved portion 401b of the front glass plate 410 can have the same thickness, and be extended from the flat portion 401a to be combined with the side member 430.

According to an embodiment, the coating layer 420 can be deposited on a front surface of the back glass plate 450, and a thickness of the curved portion 401b of the back glass plate 450 can get thinner as it goes to an edge. The back glass plate 450 can be arranged to face the front glass plate 410 with the side member 430 interposed therebetween.

According to various embodiments, the curved portion 401b of the front glass plate 410 can, as in the back glass plate 450, be formed in a shape of getting thinner as it goes to an edge, and the curved portion 401b of the back glass plate 450 can be formed to have a predetermined thickness.

According to an embodiment, the coating layer 420 can be formed to have a thinner thickness (tR) in the curved portion 401b than a thickness (tP) in the flat portion 401c. The coating layer 420 can be laminated on the glass plate 410 or 450 in a deposition process. The glass plate 410 or 450 includes the curved portion 401b, so a distance between a target used for the deposition process and the flat portion 401a or curved portion 401b can be mutually different. An amount of particles reaching the glass plate 410 or 450 after emitted from a target containing a material of a deposited layer can be different, so the thickness of the coating layer 420 deposited on the glass plate 410 or 450 can be different according to the distance with the target. The thickness of the coating layer 420 formed in the curved portion 401b can be formed thinly.

According to an embodiment, the coating layer 420 can include at least one or more high refractive layers and at least one or more low refractive layers. The high refractive layer and the low refractive layer can have mutually different refractive indexes. The respective high refractive layer and low refractive layer can be mutually crossed and arranged to form the coating layer 420. The high refractive layer can have a high hardness, so the high refractive layer can perform a function of an optical coating layer or anti-scratch layer, and can be comprised of a complicated coating layer having all the two functions. In response to a plurality of refractive layers being laminated and thus a destructed wavelength becoming more, it can decrease a reflectance of a region having a broadband such as a visible ray region.

According to an embodiment, in response to the thicknesses of the flat portion 401a and the curved portion 401b being different, although the coating layer 420 whose low reflectance is low in the flat portion 401a is formed, a user can recognize that there is a change of color in the curved portion 401b. Because the curved portion 401b has a thinner thickness than the flat portion 401a, a reflection spectrum the coating layer 420 of the flat portion 401a has can be moved to a short wavelength in the coating layer 420 of the curved portion 401b.

According to an embodiment, to minimize a color difference between the flat portion 401a, and the curved portion 401b, of the glass plate 410, the flat portion 401a can be formed by a coating layer having a reflectance difference of 3% or less at 700 nm to 900 nm among visible ray and near infrared ray regions. In response to the reflectance difference in the flat portion exceeding 3% at 700 nm to 900 nm, a change of color in the flat portion and the curved portion can be sensed. So, there can be, in the flat portion and the curved portion, a difference between a color of a light emitted from the display and a reflection color of a film attached to a rear surface of the glass plate and/or deposited paints and materials. A color recognized through the curved glass can be recognized differently from the original color.

A movement of a reflectance spectrum dependent on a thickness of a coating layer and a way capable of decreasing a reflectance of a visible ray in a curved portion are described with reference to FIG. 5, FIG. 6, and FIG. 7.

Figure 5:
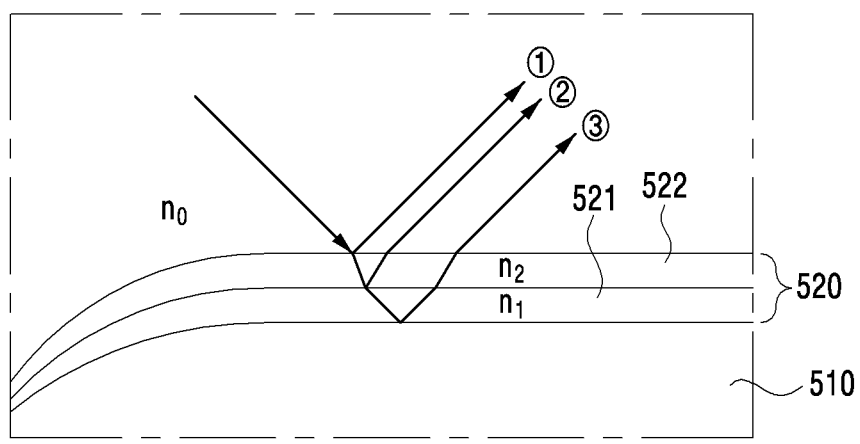
FIG. 5 is a diagram illustrating a reflection path of light in a housing of an electronic device according to an embodiment.

FIG. 5 is a diagram illustrating a reflection path of light in a housing of an electronic device of an embodiment. FIG. 6 is a diagram illustrating a destructive interference of a reflected light in a housing of an electronic device of an embodiment. FIGS. 7A and 7B are diagrams illustrating a variation of a reflectance dependent on a thickness of a coating layer in an electronic device of an embodiment.

Referring to FIG. 5, a plurality of coating layers 520 can be laminated on one surface of a glass plate 510. FIG. 5 illustrates an embodiment for explaining a function of an anti-reflection coating layer.

According to an embodiment, the coating layer 520 can include an anti-reflection function, and can include a first coating layer 521 and a second coating layer 522. The first coating layer 521 and the second coating layer 522 can have mutually different refractive indexes. According to an embodiment, a refractive index (n1) of the first coating layer 521 can be less than a refractive index (n2) of the second coating layer 522, and be greater than a refractive index (n0) of air. According to various embodiments, the coating layer 520 for reflection prevention can form more coating layers than the coating layer shown in FIG. 5. An anti-reflection coating layer formed as a single layer can form a reflectance of almost 0 for one wavelength, but the coating layer for reflection prevention of a broadband such as the whole visible ray region can be formed as a plurality of layers.

Figure 6:
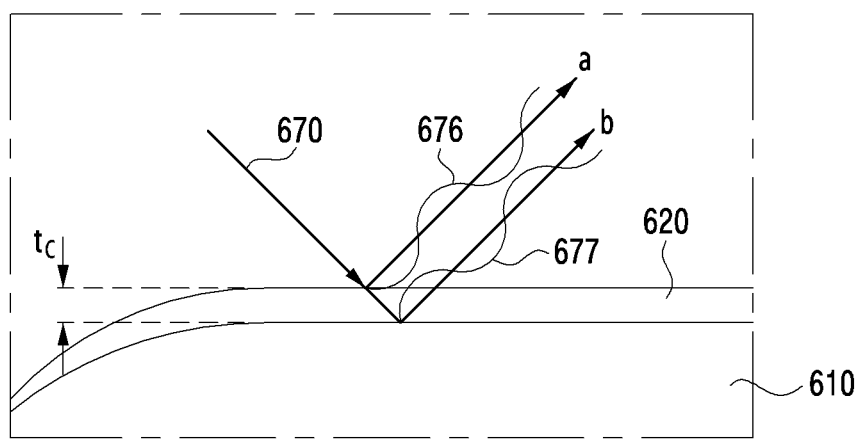
FIG. 6 is a diagram illustrating a destructive interference of a reflected light in a housing of an electronic device according to an embodiment.
Figure 7A:
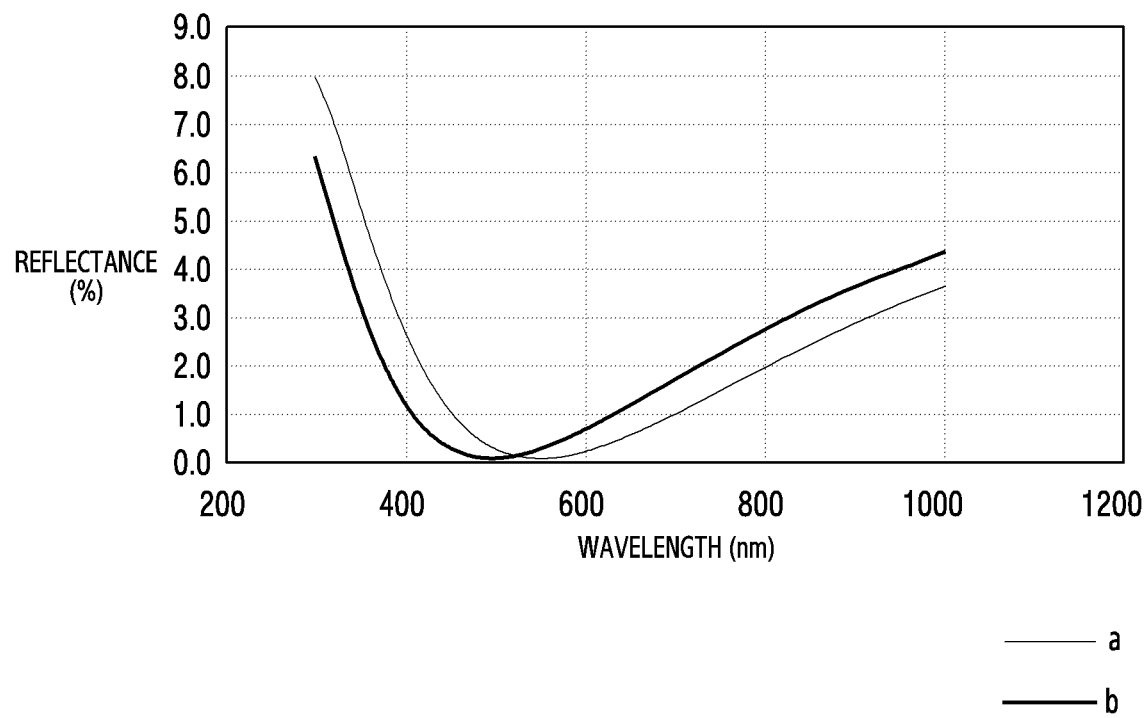
FIG. 7A is a diagrams illustrating a variation of a reflectance dependent on a thickness of a coating layer in an electronic device according to an embodiment.
Figure 7B:
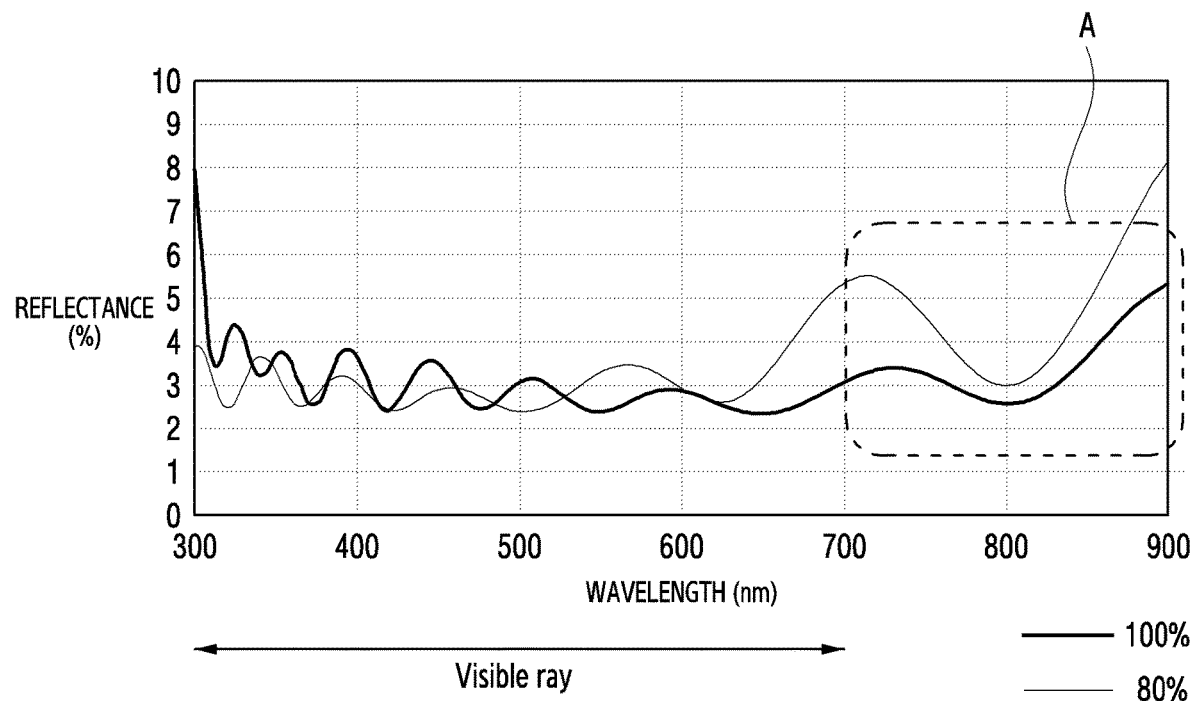
FIG. 7B is a diagram illustrating a variation of a reflectance dependent on a thickness of a coating layer in an electronic device according to an embodiment.

Referring to FIG. 6, a single coating layer 620 can be laminated on one surface of the glass plate 610. FIG. 6 illustrates an embodiment for explaining that a light of a single wavelength provided in the single coating layer is destructed.

According to an embodiment, the single coating layer 620 can decrease a reflectance of a light having one wavelength. A portion of an incident light 670 incident toward the coating layer 620 can be reflected from an outer surface of the single coating layer 620, and a reflected light can travel along a light path (a). A portion transmits the single coating layer 620 and travels to the glass plate 610. A light having transmitted the single coating layer 620 can be reflected from a surface of the glass plate 610, and transmit the coating layer 620 and be reflected. The reflected light can travel along a light path (b).

According to an embodiment, a light reflected from an outer surface of the coating layer 620 and traveling along the light path (a), and a light reflected from a surface of the glass plate 610 and traveling along the light path (b) can be destructively interfered. Because the coating layer 620 corresponds to a medium having a greater refractive index than air (when the coating layer is a denser medium than air), fixed end reflection takes place, and a reflected light is phase varied by 180 degrees with respect to the incident light and be reflected. In response to a refractive index of the coating layer 620 being less than a refractive index of the glass plate 610 (when the coating layer is a looser medium than the glass plate), fixed end reflection takes place on a surface of the glass plate 610, and a light reflected from the surface of the glass plate 610 can be phase varied by 180 degrees with respect to the incident light and be reflected.

The reflected light reflected from the outer surface of the coating layer 620 and traveling along the light path (a) can be varied in phase and travel at a first wavelength 676. The reflected light reflected from the surface of the glass plate 610 and traveling along the light path (b) can be varied in phase with respect to the incident light 670 and travel at a second wavelength 677. In response to amplitudes of the first wavelength 676 and the second wavelength 677 being identical, phases of the first wavelength 676 and the second wavelength 677 can be mutually destructed by a difference of 180 degrees, so the reflected light can be eliminated.

In this case, to eliminate the reflected light by the destructive interference in the single coating layer, a wavelength of the incident light can be λc in the coating layer, and a thickness (Tc) of the single coating layer can be 1/4λc. In response to the thickness (Tc) of the single coating layer being 1/4λc, because a light path from being reflected from the surface of the glass plate 610 to being again forwarded to air is 1/2λc, a phase difference between the first wavelength 676 and the second wavelength 677 traveling along the light path (a) and the light path (b) can be 180 degrees, so a destructive interference can take place. Because the reflected light is destructive interfered, the reflected light may not be recognized by a user.

A condition in which destructive interference can occur with regard to anti-reflective coating can be given as in Equation below.

$$2t_c = \left(m + \frac{1}{2}\right)\frac{\lambda}{n}$$

The $t_c$ can be a thickness of the coating layer 620, and the λ can denote a wavelength of light, and the n can denote a refractive index of the coating layer. Even in response to the thickness of the coating layer of an embodiment being formed as 3/2λc, 5/2λc, or 7/2λc, etc., a reflected light can be destructive interfered with respect to a corresponding wavelength.

According to an embodiment, the coating layer 620 can be formed to have a thin thickness in a curved portion. According to the above-described Equation, the thickness ($t_c$) of the coating layer and the wavelength (λ) of light are in direct proportional relation, so in response to the thickness of the coating layer being thin, the wavelength of light at which destructive interference occurs can become short.

Referring to FIG. 7A, a movement of a reflection spectrum at thickness decrease in the single coating layer is illustrated. Graph (a) represents a reflectance of the coating film whose thickness is about 100 nm on a glass having a refractive index of 1.8, and whose refractive index is about 1.38. Graph (b) represents a reflectance of the coating film whose thickness is about 90 nm. A reflectance for each wavelength can be appreciated by determining an intensity, and a phase difference, of a reflected light dependent on a refractive index of each medium.

According to an embodiment, if introducing into $$2t_c = \left(m + \frac{1}{2}\right)\frac{\lambda}{n}$$

and determining, it can be appreciated that a wavelength at which a destructive interference occurs in the coating layer corresponding to graph (a) is 550 nm. In graph (a), it can be identified that a reflectance is formed as 0% before and after about 550 nm. It can be appreciated that, if determining using the above Equation, a wavelength at which a destructive interference occurs in the coating layer corresponding to graph (b) is 500 nm. In graph (b), it can be identified that a reflectance is formed as 0% before and after about 500 nm. It can be appreciated that, if the thickness of the coating film gets thin, a reflectance spectrum is moved to a short wavelength. It can be appreciated that this matches with a description made in FIG. 6.

Referring to FIG. 7B, a coating layer formed by a plurality of layers can be made to have a reflectance of a predetermined level or less even at a broadband wavelength. In response to including the plurality of coating layers, a wavelength at which a destructive interference occurs by each coating layer can be formed variously, and can include a region at which a change of a reflectance is less at a broadband. The plurality of coating layers can maintain a reflectance of a predetermined range at a band where a visible ray region is positioned.

According to an embodiment, thicknesses of the plurality of coating layers in a region satisfying a design have almost no reflectance difference in the visible ray region, but in response to the thickness of the coating layer getting thin, a reflectance spectrum in a visible ray and near infrared ray region can move, similarly to FIG. 7A, to a visible ray region being a short-wavelength region. The reflectance difference exceeds a predetermined range, and a color change can be recognized with user's sight.

According to an embodiment, in response to forming the coating layer by using a deposition process, the coating layer of a curved portion is formed to have a thin thickness, so a user can differently recognize colors of the curved portion and a flat portion and thus, can apply a coating layer decreasing a reflectance difference in a visible ray and near infrared ray region (700 nm to 3000 nm). In response to the coating layer having a less reflectance difference dependent on a wavelength in the visible ray and near infrared ray region, even if a thickness is less formed in the curved portion, a reflectance difference in the visible ray region can be decreased. According to various embodiments, in response to there being a difference of a reflectance at a wavelength of 700 nm to 900 nm of the visible ray and near infrared ray region (region A), the color of the curved portion can be recognized visually differently. In order that there is no color change of the curved portion, the coating layer can be formed to have a reflectance difference of 3% or less in the visible ray and near infrared ray region (region A) of 700 nm to 900 nm.

Figure 8:
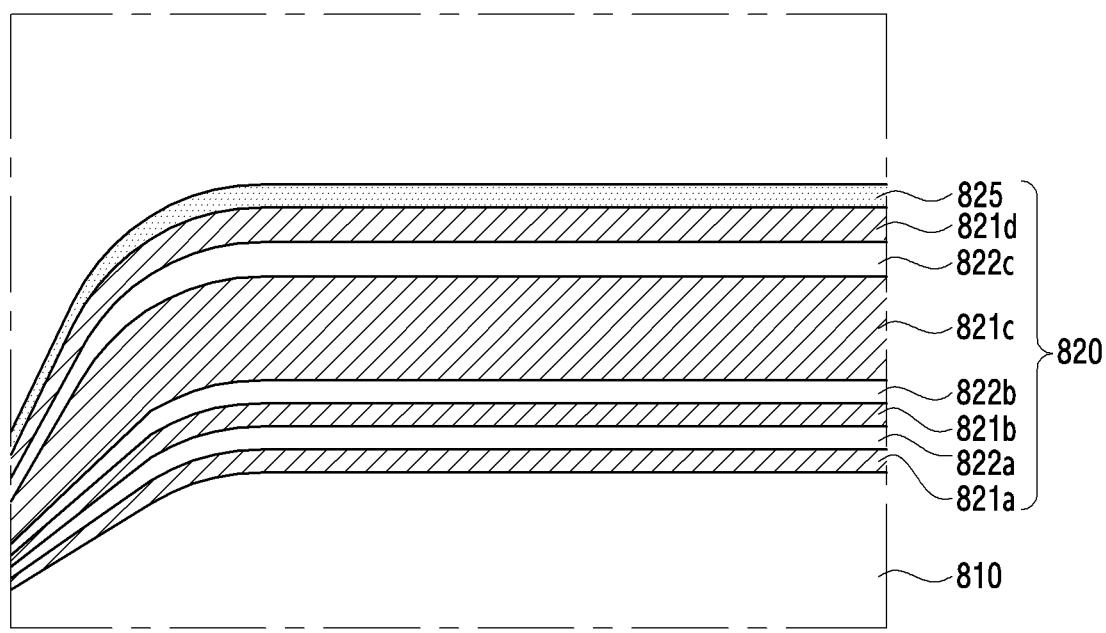
FIG. 8 is a diagram illustrating a structure of a coating layer of an electronic device according to an embodiment.

FIG. 8 is a diagram illustrating a structure of a coating layer of an electronic device according to an embodiment.

Referring to FIG. 8, a curved glass (e.g., the curved glass 401 of FIG. 4) can include a glass plate 810, a plurality of coating layers 821a, 821b, 821c, 821d, 822a, 822b, and 822c, laminated on the glass plate, and a surface modification layer 825.

According to an embodiment, the glass plate 810 can be a front plate (e.g., the front plate 102 of FIG. 1) arranged on a display (e.g., the display 330 of FIG. 3), and can be a back plate (e.g., the back plate 111 of FIG. 2). The glass plate 810 used as the front plate 102 can include a glass, or a polymer member, of transparent materials. The glass plate 810 used as the back plate 111 can include a glass of transparent materials, a colored glass, a ceramic, polymers, and/or a metal.

According to an embodiment, owing to a refractive index difference between the glass plate 810 and air, the reflection of a visible ray can take place in a surface of the glass plate 810. To mutually destruct light reflected from a contact surface between the coating layers 820 and air and a contact surface between the coating layers 820 and the glass plate 810 for the purpose of decreasing a reflectance, the plurality of coating layers 820 having a suitable thickness can be laminated on the glass plate 810.

According to an embodiment, the plurality of coating layers 820 can be formed by first layers 821a, 821b, 821c and 821d and second layers 822a, 822b and 822c. The first layers 821a, 821b, 821c and 821d can be high refractive layers of high refractive indexes, and the second layers 822a, 822b and 822c can be low refractive layers of refractive indexes lower than those of the first layers 821a, 821b, 821c and 821d. The plurality of first layers 821a, 821b, 821c and 821d and second layers 822a, 822b and 822c can be each formed to have a different thickness. The thicknesses of the first layers 821a, 821b, 821c and 821d and the second layers 822a, 822b and 822c can be suitably selected to destruct light reflected from higher layers, and lower layers, of the coating layers 820.

According to an embodiment, the first layers 821a, 821b, 821c and 821d and the second layers 822a, 822b and 822c can be arranged to cross mutually. In each surface of the first layers 821a, 821b, 821c and 821d and the second layers 822a, 822b and 822c arranged to cross mutually, light can transmit and be reflected, and a reflectance can be maintained at a predetermined level or less in various wavelength regions by a destructive interference of light reflected from surfaces of the coating layers. A sequence of lamination of the coating layers 820 laminated on the glass plate 810 is changeable. According to an embodiment, the coating layers 820 can first laminate the first layers 821a, 821b, 821c and 821d being the high refractive layers, and alternately laminate, on the high refractive layers, the second layers 822a, 822b and 822c being the low refractive layers. According to various embodiments, the coating layers 820 can first laminate the second layers 822a, 822b and 822c being the low refractive layers and then, alternately laminate the first layers 821a, 821b, 821c and 821d being the high refractive layers.

According to an embodiment, at least one of the first layers 821a, 821b, 821c and 821d corresponding to the high refractive layers can be an anti-scratch layer 821c having a high hardness, and can be formed to have a predetermined thickness or more. The anti-scratch layer 821c can be arranged between laminated structures of the plurality of coating layers 820. To secure an anti-scratch function, the anti-scratch layer 821c can be formed to have a thickness of 200 nm or more. A hardness of the glass plate 810 on which the coating layers 820 have been laminated can be 11 GPa or more at an indentation depth of 200 nm when measuring with the nanoindenter (Oliver and Pharr measurement method, Berkovich tip).

According to an embodiment, the first layers 821a, 821b, 821c and 821d and the second layers 822a, 822b and 822c can be deposited in one surface of the glass plate 810 through a deposition process. The glass plate 810 includes a curved portion (e.g., the curved portion 401b of FIG. 4B) and a flat portion (e.g., the flat portion 401a of FIG. 4B), so a distance from a target emitting a deposition material is different and thus thicknesses of the coating layers 820 deposited on the curved portion (e.g., the curved portion 401b of FIG. 4B) can be formed thinner than the coating layers 820 of the flat portion (e.g., the flat portion 401a of FIG. 4B). According to various embodiments, although the coating layers 820 are formed to be different in thickness, a reflectance of a visible ray and near infrared ray region of the coating layers can be optimized in order to minimize a color change. In detail, the coating layers can form a reflectance difference of a wavelength of 700 nm to 900 nm within 3%.

According to an embodiment, a total thickness of the high refractive layers can be formed as 200 nm to 1500 nm, and a thickness of the whole coating layers 820 can be formed as 500 nm to 3000 nm. The thickness of the high refractive layers can be formed by the percentage of 60% or more of the thickness of the whole coating layers 820. The anti-scratch layer 821c can be formed as 200 nm or more.

According to an embodiment, the thickness of the coating layers 820 formed in the curved portion 801b is thin and a reflection spectrum (referring to FIG. 7B) is moved to a short wavelength, so a reflection spectrum of an infrared ray region having a relatively high reflectance can invade a visible ray region. A user can recognize a color change with the spectrum of the near infrared ray region having the relatively high reflectance, and the user can recognize the color change in the curved portion 801b because a reflectance difference is 3% or more in the visible ray and near infrared ray region being 700 nm to 900 nm. According to various embodiments, the coating layers 820 whose maximum reflectance difference is within 3% in the visible ray and near infrared ray region of 700 nm to 900 nm being incident on the coating layers 820 can be laminated on the glass plate 810.

The surface modification layer 825 formed by a coating layer increasing a water contact angle or decreasing a friction coefficient can be included on the coating layers 820. The surface modification layer 825 can be formed in a wet spray method, and can be formed in a deposition method. The surface modification layer can be formed to have a thickness of 10 nm or less.

Figure 9:
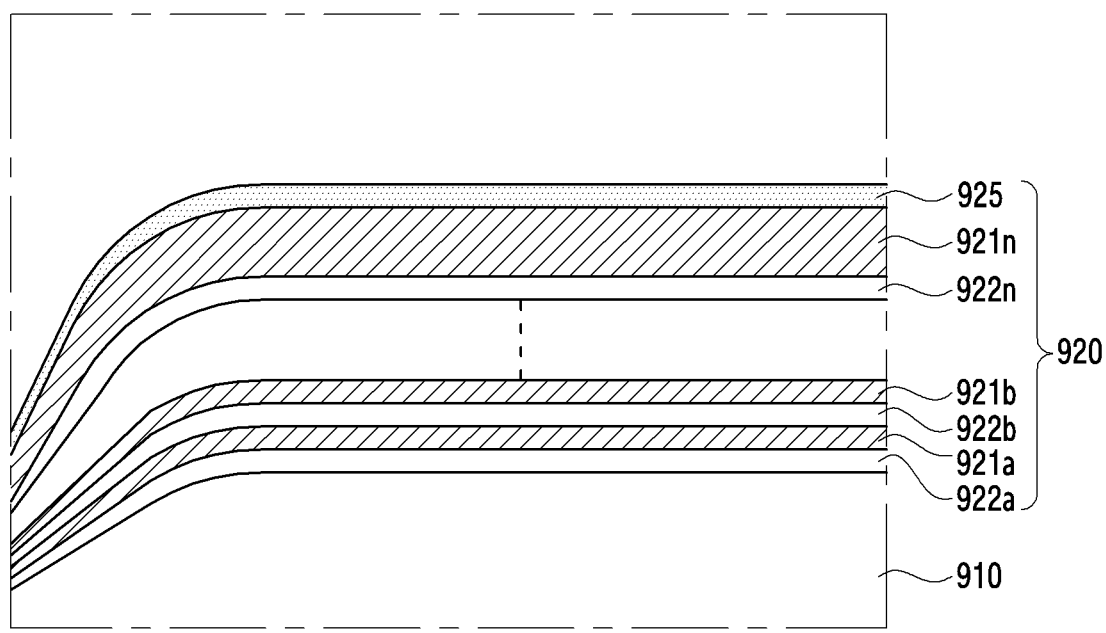
FIG. 9 is a diagram illustrating a structure of a coating layer of an electronic device according to another embodiment.

FIG. 9 is a diagram illustrating a structure of a coating layer of an electronic device according to another embodiment.

Referring to FIG. 9, a curved glass (e.g., the curved glass 401 of FIG. 4) can include a glass plate 910, a plurality of coating layers 921a, 921b, 921n, 922a, 922b and 922n laminated on the glass plate, and a surface modification layer 925.

According to an embodiment, the first layers 921a, 921b and 921n can be formed as high refractive layers, and the second layers 922a, 922b and 922n can be formed as low refractive layers. The plurality of first layers 921a, 921b and 921n and second layers 922a, 922b and 922n can be each formed to have a different thickness. Thicknesses of the first layers 921a, 921b and 921n and the second layers 922a, 922b and 922n can be suitably selected to destruct light reflected from higher layers, and lower layers, of the coating layers 920.

According to an embodiment, the first layers 921a, 921b and 921n and the second layers 922a, 922b and 922n can be arranged to cross mutually. In each surface of the first layers 921a, 921b and 921n and the second layers 922a, 922b and 922n arranged to cross mutually, light can transmit and be reflected, and a reflectance can be maintained at a predetermined level or less in various wavelength regions by a destructive interference of light reflected from surfaces of the coating layers. A sequence of lamination of the coating layers 920 laminated on the glass plate 910 is changeable. According to an embodiment, the coating layers 920 can first laminate the first layers 921a, 821b and 921n being the high refractive layers, and alternately laminate, on the high refractive layers, the second layers 922a, 922b and 922n being the low refractive layers. According to various embodiments, the coating layers 820 can first laminate the second layers 922a, 922b and 922n being the low refractive layers and then, can alternately laminate the first layers 921a, 921b and 921n being the high refractive layers.

According to an embodiment, at least one of the first layers 921a, 921b and 921n corresponding to the high refractive layers can be an anti-scratch layer 921n having a high hardness for protecting the glass plate 910, and can be formed to have a predetermined thickness or more. The anti-scratch layer 921n can be arranged in the uppermost layer of the plurality of coating layers 920. To secure an anti-scratch function, the anti-scratch layer 921n can be formed to have a thickness of 200 nm or more. A hardness of the glass plate 910 on which the coating layers 920 have been laminated can be 11 GPa or more at an indentation depth of 200 nm when measuring with the nanoindenter.

According to various embodiments, to secure an anti-scratch function of a surface of an electronic device (e.g., the electronic device 400 of FIG. 4), a thickness of the anti-scratch layer 821c or 921n can be 200 nm or more, and the percentage of the first layers 821a, 821b, 821c, 821d, 821a, 821b and 821n being the high refractive layers can be 60% or more among the whole coating layers 820 or 920.

According to various embodiments, the first layers 821a, 821b, 821c, 821d, 921a, 921b and 921n being the high refractive layers can include at least one of SiNx, GeO$_2$, Al$_2$O$_3$, ZrO$_2$ or TiO$_2$. The second layers 822a, 822b, 822c, 922a, 922b and 922n being the low refractive layers can include at least one of SiOx, AlN, AlOxNy, GeO$_2$, Al$_2$O$_3$, ZrO$_2$ or TiO$_2$. The high refractive layers and the low refractive layers can have mutually different refractive indexes, and be laminated to cross mutually.

The surface modification layer 825 or 925 can include at least one of polymers, fluoropolymers, plasma-polymerized polymers, siloxane polymers, silsesquinoxane, polyimides, fluorinated polyimides, polyetherimide, polyethersulfone, polyphenylsulfone, polycarbonate, polyethylene terephthalate, polyethylene naphthalate, acrylic polymers, urethane polymers or polymethylmethacrylate.

Referring to FIG. 8 and FIG. 9, the coating layers 820 or 920 can be formed as in the following embodiments. The coating layers of various embodiments and a comparative example are described below.

TABLE 1

| Division | | Embodiment | | | | | | | | | |
|---|---|---|---|---|---|---|---|---|---|---|---|
| Layer | material | 1 | 2 | 3 | 4 | 5 | 6 | 7 | 8 | 9 | 10 |
| 1 | SiNx | 11 | 6 | 8 | 9 | 10 | 9 | 8 | 9 | 9 | 6 |
| 2 | SiOx | 57 | 50 | 51 | 50 | 48 | 49 | 52 | 49 | 47 | 60 |
| 3 | SiNx | 29 | 21 | 24 | 28 | 26 | 8 | 11 | 8 | 14 | 21 |

TABLE 1-continued

| Division | | Embodiment | | | | | | | | | |
|---|---|---|---|---|---|---|---|---|---|---|---|
| Layer | material | 1 | 2 | 3 | 4 | 5 | 6 | 7 | 8 | 9 | 10 |
| 4 | SiOx | 32 | 36 | 32 | 31 | 32 | 11 | 7 | 9 | 11 | 38 |
| 5 | SiNx | 50 | 41 | 43 | 48 | 49 | 21 | 16 | 22 | 18 | 40 |
| 6 | SiOx | 9 | 12 | 10 | 9 | 8 | 30 | 30 | 29 | 22 | 12 |
| 7 | SiNx | 942 | 994 | 700 | 522 | 210 | 46 | 44 | 48 | 47 | 887 |
| 8 | SiOx | 13 | 12 | 12 | 14 | 14 | 10 | 10 | 8 | 6 | 13 |
| 9 | SiNx | 39 | 36 | 31 | 33 | 30 | 992 | 1002 | 711 | 741 | 31 |
| 10 | SiOx | 57 | 80 | 95 | 82 | 85 | 12 | 14 | 12 | 13 | 92 |
| 11 | SiNx | 18 | 5 | — | 3 | 3 | 32 | 37 | 33 | 37 | — |
| 12 | SiOx | — | 5 | — | 5 | 5 | 90 | 91 | 90 | 90 | — |
| Visible ray transmittance (%) | | 91.9 | 93.8 | 94.1 | 95.3 | 94.7 | 93.9 | 93.8 | 94.1 | 94 | 93.8 |
| Nano indenter hardness (Gpa) | | 15.5 | 17.2 | 14.3 | 12.1 | 12.3 | 16.1 | 17.8 | 15.1 | 15.3 | 14.9 |
| 700~900 nm Reflectance (%) | Max. | 7.0 | 8.2 | 6.2 | 6.9 | 7.3 | 6.9 | 7 | 6.4 | 7 | 7.4 |
| | Min. | 6.2 | 5.3 | 4.8 | 5.3 | 5.3 | 5.3 | 5.6 | 5.3 | 5.6 | 4.9 |
| | Diff. | 0.9 | 2.9 | 1.4 | 1.5 | 2.0 | 1.6 | 1.4 | 1.1 | 1.4 | 2.5 |
| Coating film thickness (nm) | SiNx thickness | 1089 | 1103 | 805 | 643 | 328 | 1108 | 1118 | 831 | 866 | 985 |
| | SiO thickness | 168 | 195 | 199 | 190 | 192 | 202 | 204 | 197 | 189 | 215 |
| | Total thickness | 1257 | 1298 | 1005 | 833 | 520 | 1310 | 1322 | 1028 | 1055 | 1200 |
| SiNx percentage (%) | | 87% | 85% | 80% | 77% | 63% | 85% | 855 | 85% | 81% | 82% |

According to various embodiments, the plurality of coating layers 820 and 920 can be arranged such that the first layers 821a, 821b, 821c, 821d, 921a, 921b and 921c being the high refractive layers consisting of SiNx and the second layers 822a, 822b, 822c, 922a, 922b and 922c being the low refractive layers consisting of SiOx are crossed with each other. According to various embodiments, the first layers 821a, 821b, 821c, 821d, 921a, 921b and 921c and the second layers 822a, 822b, 822c, 922a, 922b and 922c can have mutually different thicknesses.

According to various embodiments, the coating layers can have a total thickness of 400 nm to 1200 nm of the high refractive layers consisting of SiNx. The total thickness of the coating layers can be formed as 500 nm or more. The thickness of the high refractive layers can be formed by 60% or more of the total thickness of the coating layers.

The coating layers 820 or 920 of various embodiments can be a technology for a coating film having an anti-scratch function suitable to a curved glass (e.g., the curved glass 401 of FIG. 4). The curved glass (e.g., the curved glass 401 of FIG. 4) can have a hardness of 11 GPa or more which is a sufficient hardness capable of protecting a surface of a portable electronic equipment. The curved glass (e.g., the curved glass 401 of FIG. 4) can maintain a transmittance of 91% or more of light of a visible ray band, and be used as a display cover. According to various embodiments, the curved glass (e.g., the curved glass 401 of FIG. 4) can have a maximum reflectance difference of 3% or less at a wavelength of 700 nm to 900 nm, so the curved glass can minimize a color change even if the coating layers 820 or 920 are deposited on a curved portion of the glass plate 810 or 910 formed by a curved surface. The electronic device (e.g., the electronic device 400 of FIG. 4) or the curved glass (e.g., the curved glass 401 of FIG. 4) of various embodiments can provide aesthetic appreciation to a user.

Figure 10:
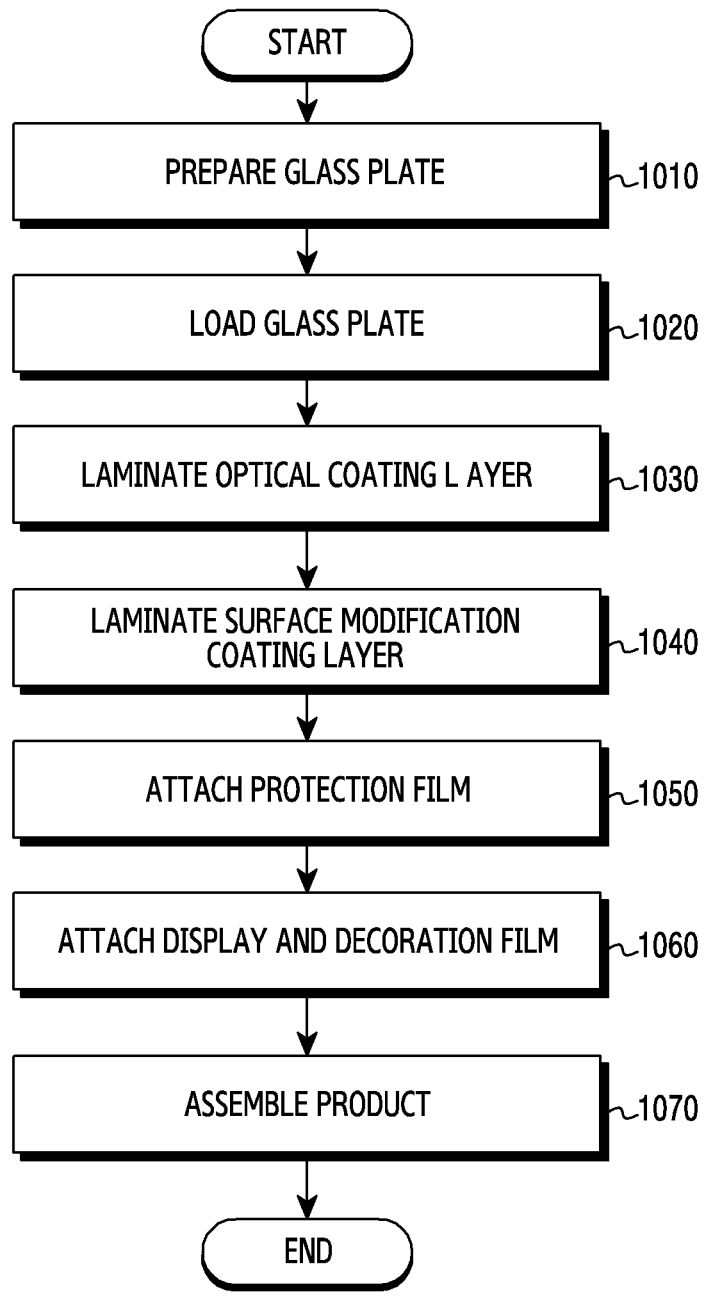
FIG. 10 is a diagram illustrating a process of forming a coating layer of an electronic device according to an embodiment.

FIG. 10 is a diagram illustrating a process of forming a coating layer of an electronic device according to an embodiment.

Referring to FIG. 10, a curved glass (e.g., the curved glass 401 of FIG. 4A) assembled to the electronic device (e.g., the electronic device 400 of FIG. 4A) can be formed through an operation of, for the sake of anti-scratch and anti-reflection, laminating a coating layer (e.g., the coating layer 420 of FIG. 4A) on a glass plate (e.g., the glass plate 410 of FIG. 4A) having a flat portion and a curved portion.

In operation 1010, the glass plate 410 can be prepared. The glass plate 410 can be a 3D glass having the curved portion at an edge portion, and can have a thickness of 2 mm or less. Before a deposition process is performed, the existence or non-existence of foreign materials in the glass plate 410 can be identified, and failure or non-failure can be identified, so the glass plate 410 capable of suffering from the deposition process can be selected. A washing process can perform chemical processing on a surface of the glass plate 410 which will be selected, or use an ultrasonic wave. In response to there not being a failure among the glass plate 410, or it being possible to eliminate, through washing, foreign materials existing in the surface of the glass plate 410, the glass plate 410 can be prepared by keeping the surface in a clean state.

In operation 1020, the glass plate 410 prepared in the surface clean state can be loaded into a vacuum chamber for the sake of coating layer deposition. Because the glass plate 410 can be a 3D glass including the curved portion, there can be a difference between a thickness of a coating layer deposited on the flat portion and a thickness of a coating layer deposited on the curved portion. According to various embodiments, to decrease a thickness difference between the coating layers of the glass plate 410, the coating layers can be deposited on the glass plate 410 within a deposition device including a rotating device.

In operation 1030, an optical coating layer can be laminated on the glass plate 410 loaded to the deposition device. The loaded glass plate 410 is rotated through revolution or rotation within the vacuum chamber, and deposition materials emitted from a target are deposited on the glass plate 410. The glass plate 410 can rotate and thus distance differences of the curved portion and the flat portion from the target can be decreased, and a thickness difference between the coating layers deposited on the curved portion and the flat portion can be minimized.

According to an embodiment, the coating layer can include at least one of SiNx, Al₂O₃, SiOx, AlN, AlOxNy, GeO₂, Al₂O₃, ZrO₂ or TiO₂. The coating layer can be comprised of a high refractive layer and a low refractive layer. The high refractive layer and the low refractive layer can be crossed and repeated and be laminated. The high refractive layer can include at least one of SiNx, GeO₂, Al₂O₃, ZrO₂ or TiO₂. The low refractive layer can include SiNx, AlN, AlOxNy, GeO₂, Al₂O₃, ZrO₂ or TiO₂. Each high refractive layer can have the same refractive index and contain the same material, and each low refractive layer can have the same refractive index and contain the same material.

According to an embodiment, the optical coating layer can be formed as thirty coating layers or less. The optical coating layer can be formed by a suitable count and a suitable each coating layer thickness, in compliance with a wavelength zone needing anti-reflection.

According to an embodiment, at least one of the high refractive layers can be formed as a high hardness layer. The high hardness layer can have a thickness of 200 nm or more for the sake of anti-scratch. The high hardness layer can be arranged between the coating layers, and can form a surface of the glass plate or the outermost surface of the optical coating layer. The whole percentage of the high refractive layers among the coating layers can be formed by 60% or more. A hardness of the glass plate on which the optical coating layer is deposited can be a hardness of 11 GP or more in an indentation depth of 200 nm, when measuring with the nanoindenter.

According to an embodiment, the whole optical coating layer deposited on the glass plate can be formed to have the performance of a transmittance of a visible ray region of 91% or more and a maximum reflectance difference of 3% or less at a wavelength of 700 nm to 900 nm. The optical-coated glass plate can secure, by a transmittance of 91% or more, a visibility of a light emitted from a display, and decrease a maximum reflectance difference at a wavelength of 700 nm to 900 nm to minimize a change of color.

According to an embodiment, each of a plurality of coating layers can have a mutually different thickness, and can properly select the percentage of the high refractive layer, the number of the coating layers, and a thickness of each layer, so as to secure the above-described performance.

In operation 1040, a surface modification coating layer can be laminated on the coating layer. According to an embodiment, the surface modification coating layer can have a thickness of 10 nm, and be formed on the optical coating layer. The surface modification coating layer can be deposited on the optical coating layer through a deposition process, and can be coated through spray jetting.

According to an embodiment, the surface modification coating layer can include polymers, fluoropolymers, plasma-polymerized polymers, siloxane polymers, silsesquinoxane, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, etc.

According to an embodiment, in response to the surface modification coating layer being formed, the performance check, and color change or non-change, of the coating layer are determined, and a curved glass usable for a product is selected.

In operation 1050, a protection film can be attached on the surface modification coating layer. The protection film can protect the coating layer, and can prevent anti-reflection performance from being deteriorated because a thickness of the coating layer gets thin. In operation 1060, a display and a decoration film can be attached. The display can be attached to a dent surface (a rear surface) of the curved glass, and the decoration film can be attached along a peripheral portion of the display. In operation 1070, the curved glass to which the display is attached can be attached to a housing of the electronic device, and the product can be assembled and completed.

An electronic device of various embodiments described above can include a housing (e.g., the housing 430 of FIG. 4B), a first glass plate (e.g., the glass plate of FIG. 4B) attached to the housing and forming a portion of an external surface of the electronic device, wherein the first glass plate includes a flat portion (e.g., the flat portion 401a of FIG. 4B) and a curved portion (e.g., the curved portion 401b of FIG. 4B) extending from an edge of the flat portion, and includes a first surface (e.g., the surface 425 of FIG. 4A) facing outwardly from the electronic device and a second surface facing inwardly towards the electronic device, and a coating layer formed on the first surface of the first glass plate. The coating layer can include a first layer having a first refractive index and containing at least one first material, and a second layer disposed further from the first surface than the first layer, and containing at least one second material, and having a second refractive index different from the first refractive index. A combination of the first glass plate and the coating layer can have a transmittance of 91% to 99%. With respect to a light having a wavelength of 700 nm to 900 nm, a difference between a minimum reflectance and a maximum reflectance can be 3% or less.

In various embodiments, the first glass plate can have a thickness of 0.3 mm to 2 mm.

In various embodiments, with respect to a total thickness of the coating layer, the percentage of a total thickness of at least one layer containing the first material can be 60% to 99%.

In various embodiments, a thickness of the first layer can be 200 nm to 1500 nm.

In various embodiments, a thickness of the coating layer can be 500 nm to 3000 nm.

In various embodiments, the first material can include at least one of SiNx, AlN, AlOxNy, GeO₂, Al₂O₃, ZrO₂, or TiO₂.

In various embodiments, the second material can include at least one of SiOx, GeO₂, Al₂O₃, ZrO₂, or TiO₂, and contain a material different from that of the first layer.

In various embodiments, the first layer can have a thinner thickness than the second layer.

In various embodiments, the coating layer can include five to thirty laminated layers, and each of the layers can contain at least one material selected among SiOx, SiNx, AlN, AlOxNy, GeO₂, Al₂O₃, ZrO₂, or TiO₂, and mutually adjacent layers among the layers can contain mutually different materials.

In various embodiments, the second material can have a lower hardness than the first material.

A curved glass (e.g., the curved glass 410 of FIG. 4B) of various embodiments can include a glass plate (e.g., the glass plate 410 of FIG. 4B) including a flat portion (e.g., the flat portion 401a of FIG. 4B) and a curved portion (e.g., the curved portion 401b of FIG. 4B) extending from an edge of the flat portion, and a coating layer laminated on a surface (e.g., the surface 425 of FIG. 4A) having a swollen curved portion of the glass plate. The coating layer can include an anti-scratch layer (e.g., the anti-scratch layer 821c of FIG. 8 or the anti-scratch layer 921n of FIG. 9), a plurality of low refractive layers (e.g., the second layers 822a, 822b and 822c) formed in at least one surface of the anti-scratch layer, and high refractive layers (e.g., the first layers 821a, 821b, 821c and 821d of FIG. 8) arranged to cross with the plurality of low refractive layers. A combination of the flat portion of the first glass plate and the coating layer can have a visible ray transmittance of 91% to 99%. With respect to a visible ray and a near infrared ray, a difference between a maximum reflectance and a minimum reflectance can be 3% or less.

In various embodiments, the visible ray and near infrared ray can be a wavelength of a 700 nm to 900 nm range.

In various embodiments, the anti-scratch layer can be arranged between the plurality of low refractive layers.

In various embodiments, a thickness of the anti-scratch layer can be 200 nm to 1200 nm.

In various embodiments, the anti-scratch layer and the high refractive layers can include at least one of SiNx, AlN, AlOxNy, $GeO_2$, $Al_2O_3$, $ZrO_2$, or $TiO_2$.

In various embodiments, the anti-scratch layer and the high refractive layers are formed of the same material.

In various embodiments, a sum of thicknesses of the anti-scratch layer and the high refractive layers can be 60% to 99% of a total thickness of the coating layer.

In various embodiments, materials of the low refractive layers can include at least one of SiOx, $GeO_2$, $Al_2O_3$, $ZrO_2$, or $TiO_2$, and can be materials having lower refractive indexes than those of the high refractive layers.

In various embodiments, thicknesses of the coating layers formed in the flat portion and the curved portion can be mutually different, and a combination of the curved portion of the glass plate and the coating layer can have a transmittance of 91% to 99%.

In various embodiments, a hardness of the coating layer can be 11 GPa to 18 GPs.

In the above-described concrete embodiments of the present disclosure, components included in the disclosure have been expressed in the singular form or plural form according to a proposed concrete embodiment. But, the expression of the singular form or plural form is selected suitable to a given situation for description convenience's sake, and the present disclosure is not limited to singular or plural components. Even a component expressed in the plural form can be constructed in the singular form, or even a component expressed in the singular form can be constructed in the plural form.

On the other hand, in a detailed description of the present disclosure, a concrete embodiment has been described, but it is undoubted that various modifications are available without departing from the scope of the present disclosure. Therefore, the scope of the present disclosure should not be limited to and defined by the described embodiment and should be defined by not only claims mentioned below but also equivalents to these claims.

The invention claimed is:

1. An electronic device comprising:
   a housing;
   a first glass plate attached to the housing and forming a portion of an external surface of the electronic device, wherein the first glass plate comprises a flat portion and a curved portion extending from an edge of the flat portion, and comprises a first surface facing outwardly from the electronic device and a second surface facing inwardly towards the electronic device; and
   a coating layer formed on the first surface of the first glass plate,
   wherein the coating layer comprises:
   a surface modification coating layer used to identify color change of the coating layer;
   a plurality of high reflective layers having a first refractive index and containing a first material, wherein the plurality of high reflective layers includes a first high reflective layer, a second high reflective layer, a third high reflective layer and a fourth high reflective layer; and
   a plurality of low reflective layers containing a second material, and having a second refractive index lower than the first refractive index, wherein the plurality of low reflective layers include a first low reflective layer, a second low reflective layer and a third low reflective layer,
   wherein the plurality of high reflective layers and the plurality of low reflective layers are stacked in order of the first glass plate, the first high reflective layer, the first low reflective layer, the second high reflective layer, the second low reflective layer, the third high reflective layer, the third low reflective layer, the fourth high reflective layer and the surface modification coating layer, according to a direction in which the second surface facing the first surface,
   wherein each thickness of the third low reflective layer and the fourth high reflective layer is thicker than each thickness of the first high reflective layer, the first low reflective layer, the second high reflective layer and the second low reflective layer,
   wherein the thickness of the third high reflective layer is thicker than each thickness of the first high reflective layer, the first low reflective layer, the second high reflective layer, the second low reflective layer, the third low reflective layer and the fourth high reflective layer,
   wherein the thickness of the third high reflective layer is 200 nm to 1200 nm,
   wherein the second material has a lower hardness than the first material,
   wherein with respect to a total thickness of the coating layer, a percentage of a total thickness of the plurality of high reflective layer is 60% to 99%, and
   wherein a combination of the first glass plate and the coating layer has a light transmittance of 91% to 99%, and with respect to a light having a wavelength of 700 nm to 900 nm, a difference between a minimum reflectance and a maximum reflectance is 3% or less.

2. The electronic device of claim 1, wherein the first glass plate has a thickness of 0.3 mm to 2 mm.

3. The electronic device of claim 1, wherein the total thickness of the coating layer is 500 nm to 3000 nm.

4. The electronic device of claim 1, wherein the first material comprises at least one of SiNx, AN, AlOxNy, GeO2, Al2O3, ZrO2, or TiO2.

5. The electronic device of claim 3, wherein the second material comprises at least one of SiOx, GeO2, Al2O3, ZrO2, or TiO2, and contains a material different from that of the plurality of high reflective layers.

6. A curved glass comprising:
   a glass plate comprising a flat portion and a curved portion extending from an edge of the flat portion; and
   a coating layer laminated on a surface having a swollen curved portion of the glass plate,
   wherein the coating layer comprises a surface modification coating layer used to identify color change of the coating layer, a plurality of low refractive layers formed in at least one surface of the glass plate, and a plurality of high refractive layers arranged to cross with the plurality of low refractive layers, wherein the plurality of high reflective layers has a first refractive index and contain a first material, wherein the plurality of high reflective layers includes a first high reflective layer, a second high reflective layer, a third high reflective layer and a fourth high reflective layer;

wherein the plurality of low reflective layers contains a second material, and have a second refractive index lower than the first refractive index, wherein the plurality of low reflective layers includes a first low reflective layer, a second low reflective layer and a third low reflective layer, wherein the plurality of high reflective layers and the plurality of low reflective layers are stacked on the at least one surface of the glass plate in order of the glass plate, the first high reflective layer, the first low reflective layer, the second high reflective layer, the second low reflective layer, the third high reflective layer, the third low reflective layer, the fourth high reflective layer and the surface modification coating layer, wherein each thickness of the third low reflective layer and the fourth high reflective layer is thicker than each thickness of the first high reflective layer, the first low reflective layer, the second high reflective layer and the second low reflective layer, wherein the thickness of the third high reflective layer is thicker than each thickness of the first high reflective layer, the first low reflective layer, the second high reflective layer, the second low reflective layer, the third low reflective layer and the fourth high reflective layer, wherein the thickness of the third high reflective layer is 200 nm to 1200 nm, wherein the second material has a lower hardness than the first material, wherein with respect to a total thickness of the coating layer, a percentage of a total thickness of the plurality of high reflective layer is 60% to 99%, and wherein a combination of the flat portion of the first glass plate and the coating layer has a light transmittance of 91% to 99%, and with respect to a light having a wavelength of 700 nm to 900 nm, a difference between a maximum reflectance and a minimum reflectance is 3% or less.

7. The curved glass of claim 6, wherein the plurality of high refractive layers comprises at least one of SiNx, AN, AlOxNy, GeO2, Al2O3, ZrO2, or TiO2.

8. The curved glass of claim 6, wherein the plurality of low refractive layers comprises at least one of SiOx, GeO2, Al2O3, ZrO2, or TiO2.

* * * * *